(12) United States Patent
Mujumdar et al.

(10) Patent No.: US 11,753,027 B2
(45) Date of Patent: Sep. 12, 2023

(54) VEHICLE LATERAL-CONTROL SYSTEM WITH ADJUSTABLE PARAMETERS

(71) Applicant: Aptiv Technologies Limited, St. Michael (BB)

(72) Inventors: Tapan R. Mujumdar, Rochester Hills, MI (US); Pardis Khayyer, Carmel, IN (US)

(73) Assignee: Aptiv Technologies Limited, St. Michael (BB)

( * ) Notice: Subject to any disclaimer, the term of this patent is extended or adjusted under 35 U.S.C. 154(b) by 178 days.

(21) Appl. No.: 17/160,304

(22) Filed: Jan. 27, 2021

(65) Prior Publication Data

US 2022/0234603 A1 Jul. 28, 2022

(51) Int. Cl.
*B60W 50/08* (2020.01)
*B60W 10/20* (2006.01)
(Continued)

(52) U.S. Cl.
CPC .......... *B60W 50/087* (2013.01); *B60W 10/20* (2013.01); *B60W 40/072* (2013.01);
(Continued)

(58) Field of Classification Search
CPC .. B60W 50/087; B60W 10/20; B60W 40/072; B60W 40/09; B60W 50/085;
(Continued)

(56) References Cited

U.S. PATENT DOCUMENTS 10,077,056 B1 * 9/2018 Fields .................. G05D 1/0088
2010/0256835 A1 10/2010 Mudalige
(Continued)

FOREIGN PATENT DOCUMENTS

DE 102016215528 A1 2/2018
EP 3744602 A1 12/2020
WO 2020166113 A1 8/2020

OTHER PUBLICATIONS

"Extended European Search Report", EP Application No. 21212702.1, dated May 11, 2022, 11 pages.
(Continued)

*Primary Examiner* — Jeff A Burke
*Assistant Examiner* — Mohamad O El Sayah
(74) *Attorney, Agent, or Firm* — Sawtooth Patent Group PLLC

(57) ABSTRACT

The techniques of this disclosure relate to a vehicle lateral-control system with adjustable parameters. The system includes a controller circuit that receives identity data from a driver-monitoring sensor indicating an identity of a driver of a vehicle. The controller circuit receives vehicle lateral-response data from vehicle sensors based on steering maneuvers performed as the vehicle operates under control of the driver. The controller circuit determines lateral-steering parameters of the vehicle based on the vehicle lateral-response data. The controller circuit adjusts lateral-control parameters of the vehicle based on the lateral-steering parameters. The controller circuit associates the adjusted lateral-control parameters of the vehicle with the identity of the driver. The controller circuit operates the vehicle according to the lateral-control parameters associated with the identity of the driver. The system can reproduce the driver's steering behavior while the vehicle is operated in an autonomous-driving mode.

20 Claims, 12 Drawing Sheets

(51) Int. Cl.
*B60W 40/072* (2012.01)
*B60W 40/09* (2012.01)
*B60W 40/08* (2012.01)

(52) U.S. Cl.
CPC .......... *B60W 40/09* (2013.01); *B60W 50/085* (2013.01); *B60W 2040/0809* (2013.01); *B60W 2420/42* (2013.01); *B60W 2420/52* (2013.01); *B60W 2520/10* (2013.01); *B60W 2540/18* (2013.01); *B60W 2540/30* (2013.01); *B60W 2552/53* (2020.02); *B60W 2554/801* (2020.02)

(58) Field of Classification Search
CPC ....... B60W 2552/53; B60W 2554/801; B60W 2040/0809; B60W 2420/42; B60W 2420/52; B60W 2520/10; B60W 2540/18; B60W 2540/30
See application file for complete search history.

(56) References Cited

U.S. PATENT DOCUMENTS

| | | | |
|---|---|---|---|
| 2019/0212749 A1 | 7/2019 | Chen et al. | |
| 2020/0207353 A1* | 7/2020 | Chen | B60W 30/18163 |
| 2020/0290621 A1* | 9/2020 | Ji | B60W 30/18163 |
| 2021/0213959 A1* | 7/2021 | Shahriari | G05D 1/0214 |
| 2021/0380117 A1* | 12/2021 | Gonzalez | B60W 50/085 |
| 2022/0073098 A1* | 3/2022 | D'Orazio | B60W 50/14 |
| 2022/0119004 A1* | 4/2022 | Avadhanam | B60W 60/005 |

OTHER PUBLICATIONS

Heil, et al., "Adaptive and Efficient Lane Change Path Planning for Automated Vehicles", Nov. 2016, pp. 479-484.

"Lane-centering problems may limit drivers' acceptance of automated systems", Retrieved at: https://www.iihs.org/news/detail/lane-centering-problems-may-limit-drivers-acceptance-of-automated-systems, Oct. 3, 2019, 4 pages.

Gorzelany, et al., "Safety Last? Driver-Assist Features That are Most Often Switched Off", Jul. 7, 2000, 5 pages.

Phelan, "Surprising tech features land these vehicles atop Wards' 10-best UX list", Retrieved at: https://www.freep.com/story/money/cars/mark-phelan/2020/08/07/peppy-wake-up-tunes-remote-park-these-cars-surprise-you/3323143001/, Aug. 7, 2020, 7 pages.

"Foreign Office Action", EP Application No. 21212702.1, dated Feb. 14, 2023, 6 pages.

* cited by examiner

VEHICLE LATERAL-CONTROL SYSTEM WITH ADJUSTABLE PARAMETERS

BACKGROUND

A Society of Automotive Engineers (SAE) Level 2 automated-driving system includes driver-assistance features that provide steering, braking, and acceleration assistance, for example, lane centering and adaptive cruise control. Vehicles equipped with Level 2 automated-driving systems require a human driver to be poised to take control of the vehicle in the event the automated-driving system relinquishes control. Factory settings of lateral-control parameters for automated-driving systems are calibrated based on an assumption that drivers will feel comfortable with the steering maneuvers performed by the system in an automated-driving mode. However, some drivers may consider the factory-set automated-steering maneuvers to feel unnatural, too aggressive for traffic conditions, or not aggressive enough for their liking. As a result, some drivers may deactivate the automated-driving mode, which can lead to reduced vehicle safety.

SUMMARY

This document describes one or more aspects of a vehicle lateral-control system with adjustable parameters. In one example, the system includes a controller circuit configured to receive, from a driver-monitoring sensor, identity data indicating an identity of a driver of a vehicle. The controller circuit receives, from one or more vehicle sensors, vehicle lateral-response data based on steering maneuvers performed as the vehicle operates under control of the driver. The controller circuit determines, based on the vehicle lateral-response data, a plurality of lateral-steering parameters of the vehicle. The controller circuit adjusts, based on the plurality of lateral-steering parameters, lateral-control parameters of the vehicle. The controller circuit associates the adjusted lateral-control parameters of the vehicle with the identity of the driver. The controller circuit operates the vehicle according to the lateral-control parameters associated with the identity of the driver.

In another example, a method includes receiving from a driver-monitoring sensor, with a controller circuit, identity data indicating an identity of a driver of a vehicle. The method includes receiving from one or more vehicle sensors, with the controller circuit, vehicle lateral-response data based on steering maneuvers performed as the vehicle operates under control of the driver. The method includes determining, based on the vehicle lateral-response data, with the controller circuit, a plurality of lateral-steering parameters of the vehicle. The method includes adjusting based on the plurality of lateral-steering parameters, with the controller circuit, lateral-control parameters of the vehicle. The method includes associating the adjusted lateral-control parameters of the vehicle with the identity of the driver. The method includes operating the vehicle, with the controller circuit, according to the lateral-control parameters associated with the identity of the driver.

This summary is provided to introduce aspects of a vehicle lateral-control system with adjustable parameters, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where sensors can be used to determine dynamics of a moving body. This summary is not intended to identify essential features of the claimed subject matter, nor is it intended for use in determining the scope of the claimed subject matter.

BRIEF DESCRIPTION OF THE DRAWINGS

The details of one or more aspects of a vehicle lateral-control system with adjustable parameters are described in this document with reference to the following drawings. The same numbers are used throughout the drawings to reference like features and components.

DETAILED DESCRIPTION

Overview

The techniques of this disclosure relate to a vehicle lateral-control system with adjustable parameters. A controller circuit receives data from in-cabin sensors that indicate an identity of a driver while the driver is operating a vehicle in a manual-driving mode. The system learns the driver's steering habits or behaviors that affect a lateral response of the vehicle, for example, how aggressively the driver steers into and out of curves or positions the vehicle relative to lane markings and adjacent vehicles. The system associates or matches the learned steering behavior with the identity of the driver and adjusts lateral-control parameters that are used to control the vehicle when the vehicle is operated in an autonomous-driving mode. The system can store the adjusted lateral-control parameters for different drivers in a memory and recall the adjusted parameters when the driver's identity is recognized by the system. The driver can further adjust an aggressiveness of the lateral-control parameters by inputting a preference into a human machine interface (HMI) that can be presented to the driver on a console display of the vehicle. The HMI can include preset and adjustable selections that relate to lane biasing and corner-cutting on curves. The vehicle lateral-control system with adjustable parameters can improve driver and passenger comfort by reproducing the driver's steering behavior when the vehicle is operating in the autonomous-driving mode, resulting in an improved user experience.

Example System

Figure 1:
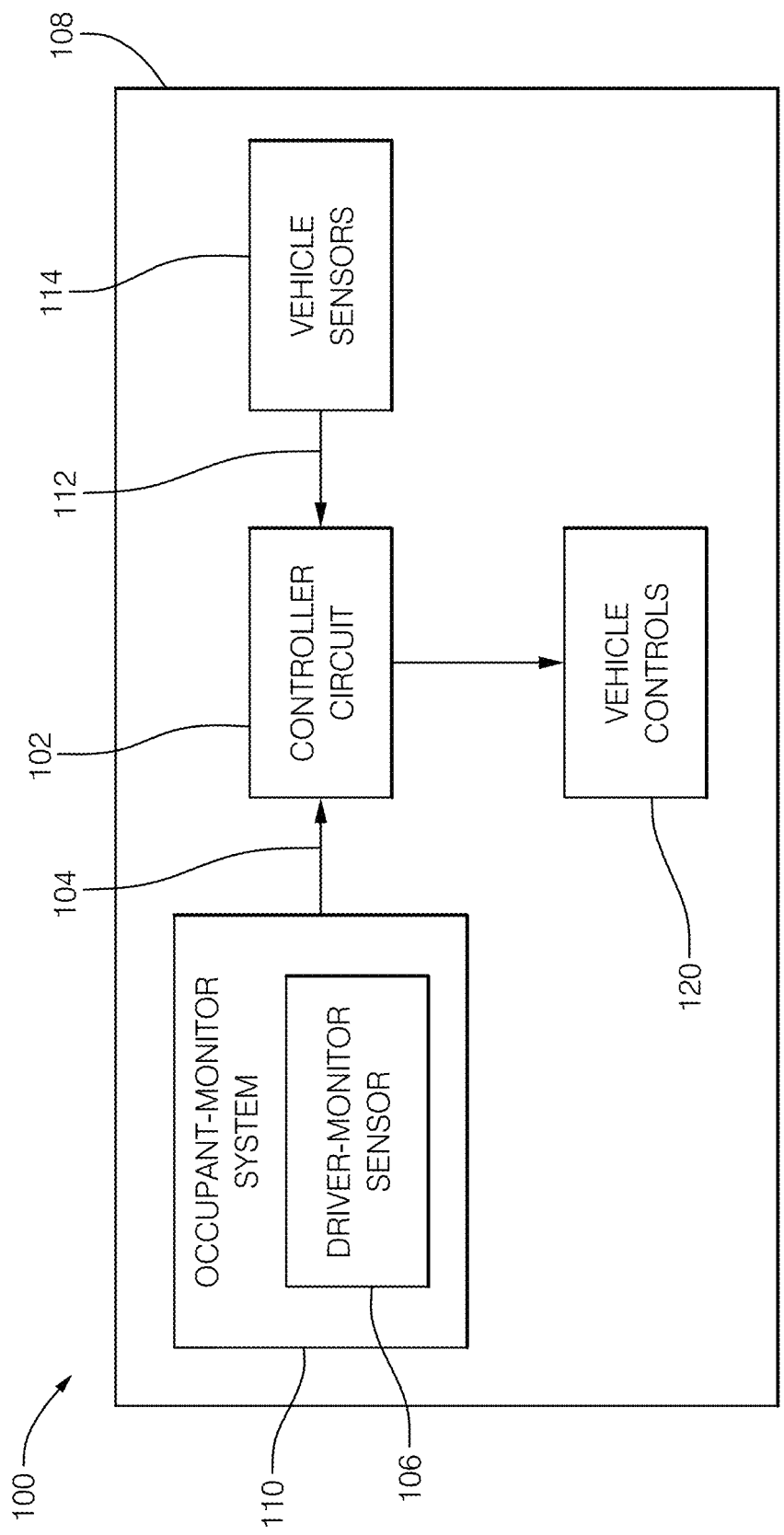
FIG. 1 illustrates an example of a vehicle lateral-control system with adjustable parameters shown mounted on a vehicle, in accordance with techniques of this disclosure.

FIG. 1 illustrates an example of a vehicle lateral-control system with adjustable parameters 100, hereafter referred to as the system 100. The system 100 includes a controller circuit 102 configured to receive identity data 104 from a driver-monitor sensor 106, indicating an identity of a driver of a vehicle 108. The driver-monitor sensor 106 can be a component of an occupant-monitor system 110 (OMS 110) installed on the vehicle 108 that monitors some or all occupants or passengers inside the vehicle cabin. The controller circuit 102 receives vehicle lateral-response data 112 based on steering maneuvers performed as the vehicle 108 operates under control of the driver, for example, as the driver steers the vehicle on a roadway and executes various turns or lane changes. The vehicle lateral-response data 112 is received from vehicle sensors 114 that directly or indirectly detect or measure lateral movement or lateral accelerations of the vehicle 108. For example, a difference between wheel speeds detected by left and right wheel-speed sensors can indirectly indicate the vehicle 108 is turning, compared to a yaw-rate sensor that directly measures an angular rotation of the vehicle 108.

The controller circuit 102 can determine, based on the vehicle lateral-response data 112, lateral-steering parameters 116 that can be used to tune or adjust lateral-control parameters 118 of the vehicle 108. The lateral-steering parameters 116 represent a processing of the raw vehicle lateral-response data 112 and can be more readily used by the controller circuit 102 to match the driver's steering behavior when operating the vehicle 108 in the autonomous-driving mode. The lateral-control parameters 118 of the vehicle 108 are calibratable or tunable parameters that can be interpreted by vehicle controls 120 to control the steering, braking, and acceleration of the vehicle 108.

The controller circuit 102 can adjust the lateral-control parameters 118 of the vehicle 108 and associate the adjusted lateral-control parameters 118 with the identity of the driver in the memory of the controller circuit 102. The controller circuit 102 can recall the adjusted lateral-control parameters 118 for a particular driver from the memory when the vehicle 108 is operated in the autonomous-driving mode and the driver is identified or recognized while seated in the driver's seat.

Although the vehicle 108 can be any vehicle, for ease of description, the vehicle 108 is primarily described as being a self-driving automobile that is configured to operate in the autonomous-driving mode to assist the driver riding onboard the vehicle 108. The vehicle 108 can be capable of SAE Level 2 autonomous operation (as referred to in the Background) that assists the driver with steering, braking, and acceleration, while the driver monitors the operation of the vehicle 108 at all times from a driver's seat.

In the example illustrated in FIG. 1, the controller circuit 102 is installed on the vehicle 108 and is communicatively coupled to the driver-monitor sensor 106, the vehicle sensors 114, and the vehicle controls 120 via transmission links. The transmission links can be wired or wireless interfaces, for example, BLUETOOTH®, Wi-Fi®, near field communication (NFC), universal serial bus (USB), universal asynchronous receiver/transmitter (UART), or controller area network (CAN). In some examples, the controller circuit 102 receives data from other vehicle systems via a CAN bus (not shown), for example, an ignition status and a transmission gear selection.

Controller Circuit

The controller circuit 102 may be implemented as a microprocessor or other control circuitry such as analog and/or digital control circuitry. The control circuitry may include one or more application-specific integrated circuits (ASICs), field-programmable gate arrays (FPGAs) that are programmed to perform the techniques, or one or more general-purpose hardware processors programmed to perform the techniques pursuant to program instructions in firmware, memory, other storage, or a combination. The controller circuit 102 may also combine custom hard-wired logic, ASICs, or FPGAs with custom programming to perform the techniques. The controller circuit 102 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller circuit 102 may include other examples of non-volatile memory, such as flash memory, read-only memory (ROM), programmable read-only memory (PROM), and erasable programmable read-only memory (EPROM). The controller circuit 102 may include volatile memory (e.g., dynamic random-access memory (DRAM), static random-access memory (SRAM)). The controller circuit 102 can include one or more clocks or timers used to synchronize the control circuitry or determine an elapsed time of events. The one or more routines may be executed by the processor to perform steps for operating the vehicle 108 based on signals received by the controller circuit 102 from the driver-monitor sensor 106 and the vehicle sensors 114 as described herein.

Driver-Monitor Sensor

Figure 2:
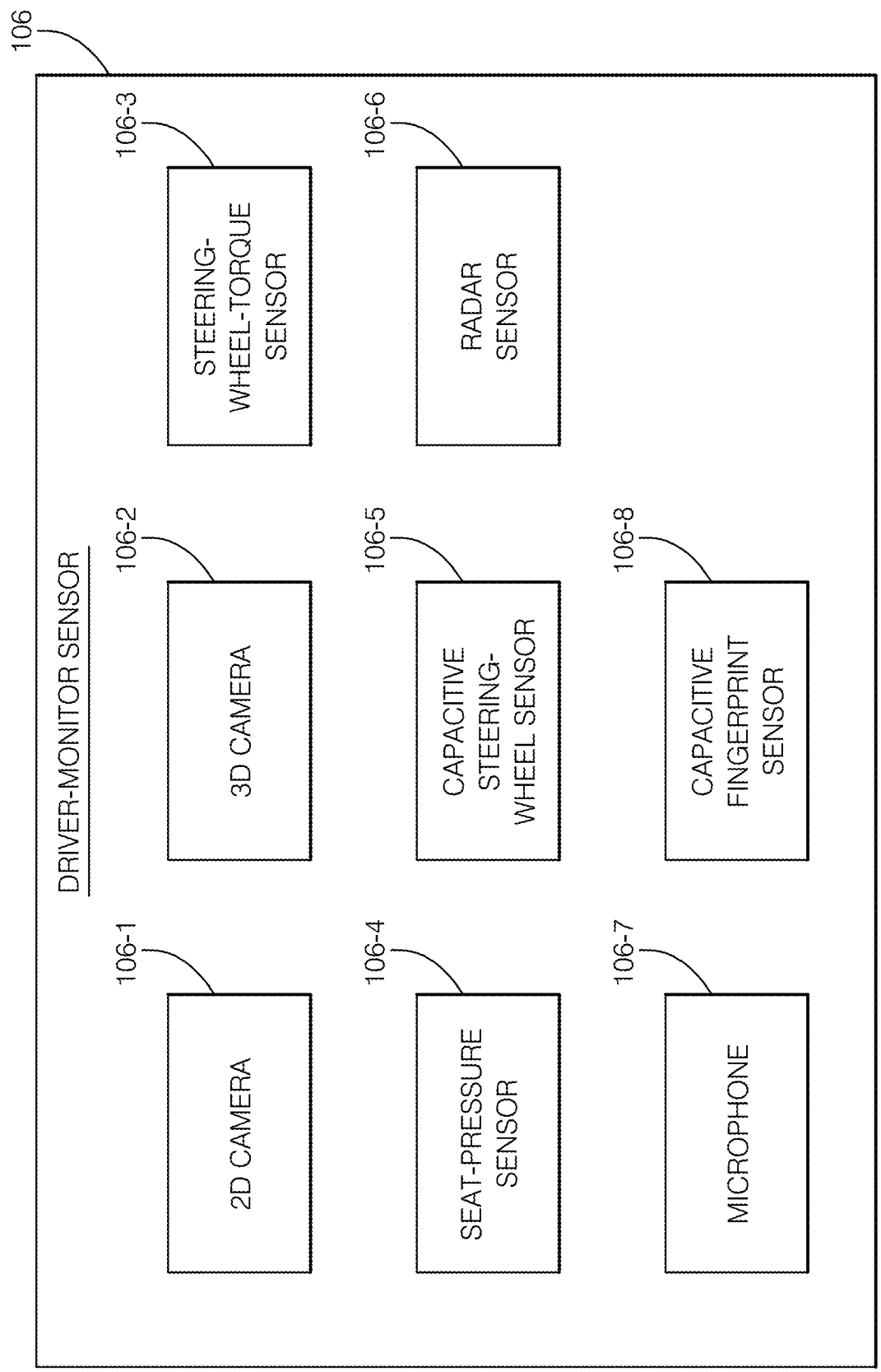
FIG. 2 illustrates an example driver-monitor sensor isolated from the example of a vehicle lateral-control system with adjustable parameters of FIG. 1.

FIG. 2 illustrates an example of the driver-monitor sensor 106 that is located remotely from the system 100. The driver-monitor sensor 106 is configured to monitor the driver of the vehicle 108, as will be described in more detail below. The driver-monitor sensor 106 can include one or more sensors that detect aspects of the driver and can be components of the OMS 110 installed on the vehicle 108. The driver-monitor sensor 106 can include a camera that captures images of the driver, and the OMS 110 determines whether the driver's seat is occupied by a person based on the images. The camera can be a two-dimensional (2D) camera 106-1 or a 3D time-of-flight camera 106-2 that measures a time for light pulses to leave the camera and reflect back on the camera's imaging array.

Software executed by the OMS 110 can distinguish persons from animals and objects using known image-analysis techniques. The objects in the images are detected in regions of interest that correspond to the seating positions (e.g., the driver's seat position) within the cabin, and the objects are classified by the software into human and other classifications. Processing blocks or models in the software are pre-trained to recognize human forms or shapes of other objects, for example, a shopping bag, a box, or an animal.

The driver-monitor sensor 106 can also include a steering-wheel-torque sensor 106-3 that detects a torque applied to the steering wheel. The torque can be detected when the driver places a hand on the steering wheel, even with the autonomous control system steering the vehicle 108. The steering-wheel-torque sensor 106-3 can be an electro-mechanical device integrated into a power-steering system of the vehicle 108 that determines a torsion bar angle required for the steering movement. The steering-wheel-torque sensor 106-3 can also output a steering angle and rate of change of the steering wheel angular position.

The driver-monitor sensor 106 can also include a seat-pressure sensor 106-4 that detects a pressure or pressure distribution applied to the seat (similarly, a steering-wheel-pressure sensor may be used to detect a pressure or pressure distribution applied by a driver's hands on the steering-wheel). The OMS 110 can determine whether the driver is occupying the driver's seat (or holding the steering-wheel) based on a pressure threshold indicative of a weight of the driver (or force exerted with a grip of the steering-wheel). For example, if the weight of the occupant is greater than thirty kilograms, the OMS 110 may determine that the driver is considered an adult. The pressure distribution can indicate whether the object occupying the driver's seat is a person or an object other than a person. The pressure distribution can also indicate whether the driver is in the correct position within the driver's seat; for example, when the driver is leaning over to one side of the seat, the pressure is concentrated on one side of the seat.

The driver-monitor sensor 106 can also include a capacitive steering-wheel sensor 106-5 that detects a touch of the driver's hands on the steering wheel. The capacitive steering-wheel sensors 106-5 can be located in a rim of the steering wheel and can detect contact points of the hands with the steering wheel. In some examples, touching the steering wheel with the hands distorts an electric field generated by the sensor and changes a capacitance of the sensor, indicating the presence of the driver's hand. The capacitive steering-wheel sensor 106-5 can detect whether one or both driver's hands are on the steering wheel.

The driver-monitor sensor 106 can also include a radar sensor 106-6 that detects a presence of objects in the vehicle cabin, and the OMS 110 can determine whether the driver's seat is occupied by the driver or the object based on point cloud data received from the radar sensor 106-6, and may detect whether the driver's hands are on the steering-wheel. The OMS 110 compares the point cloud data to models in the software to determine whether the seat is occupied by the person or the object. In some examples, the radar sensor 106-6 can detect relatively small movements, for example, movements of a chest wall of the driver that is breathing (e.g., a child in a car seat).

The driver-monitor sensor 106 can also include a microphone 106-7 that detects a voice of the driver, and the OMS 110 can use voice-recognition software to process voice recordings to determine the identifying features that are unique to the voice of the driver. The microphone 106-7 can be a component of an infotainment system of the vehicle 108.

The driver-monitor sensor 106 can also include a capacitive fingerprint sensor 106-8 that detects a fingerprint of the driver, and the OMS 110 can use fingerprint-recognition software to process the fingerprints to determine the identifying features that are unique to the detected fingerprints of the driver.

The OMS 110 and controller circuit 102 can use machine learning to detect the various driver aspects and steering behaviors. Machine learning is a data-analytics technique that teaches computers to learn from experience. Machine learning routines, or algorithms, use computational methods to learn information from data without relying on a predetermined equation as a model. The routines improve their performance as the sample size available for learning increases. Machine learning uses two types of techniques: supervised learning, which trains a model on known input and output data so that it can predict future outputs, and unsupervised learning, which finds hidden patterns or intrinsic structures in input data.

Supervised learning uses classification and regression techniques to develop predictive models. Common algorithms for performing classification include support vector machine (SVM), boosted and bagged decision trees, k-nearest neighbor, Naïve Bayes, discriminant analysis, logistic regression, and neural networks. Common regression algorithms include linear model, nonlinear model, regularization, stepwise regression, boosted and bagged decision trees, neural networks, and adaptive neuro-fuzzy learning. Unsupervised learning finds hidden patterns or intrinsic structures in data and is used to draw inferences from datasets consisting of input data without labeled responses. Clustering is a common unsupervised learning technique. Common algorithms for performing clustering include k-means and k-medoids, hierarchical clustering, Gaussian mixture models, hidden Markov models, self-organizing maps, fuzzy c-means clustering, and subtractive clustering. In the context of self-driving automobiles, the OMS 110 and controller circuit 102 can use machine learning specifically to determine, based on the driver-monitor sensor 106, the identity of the driver or other aspects of driving behavior that feed the vehicle lateral-response data 112 to ensure the controller circuit 102 can accurately determine the lateral-steering parameters 116.

Vehicle Sensors

Figure 3:
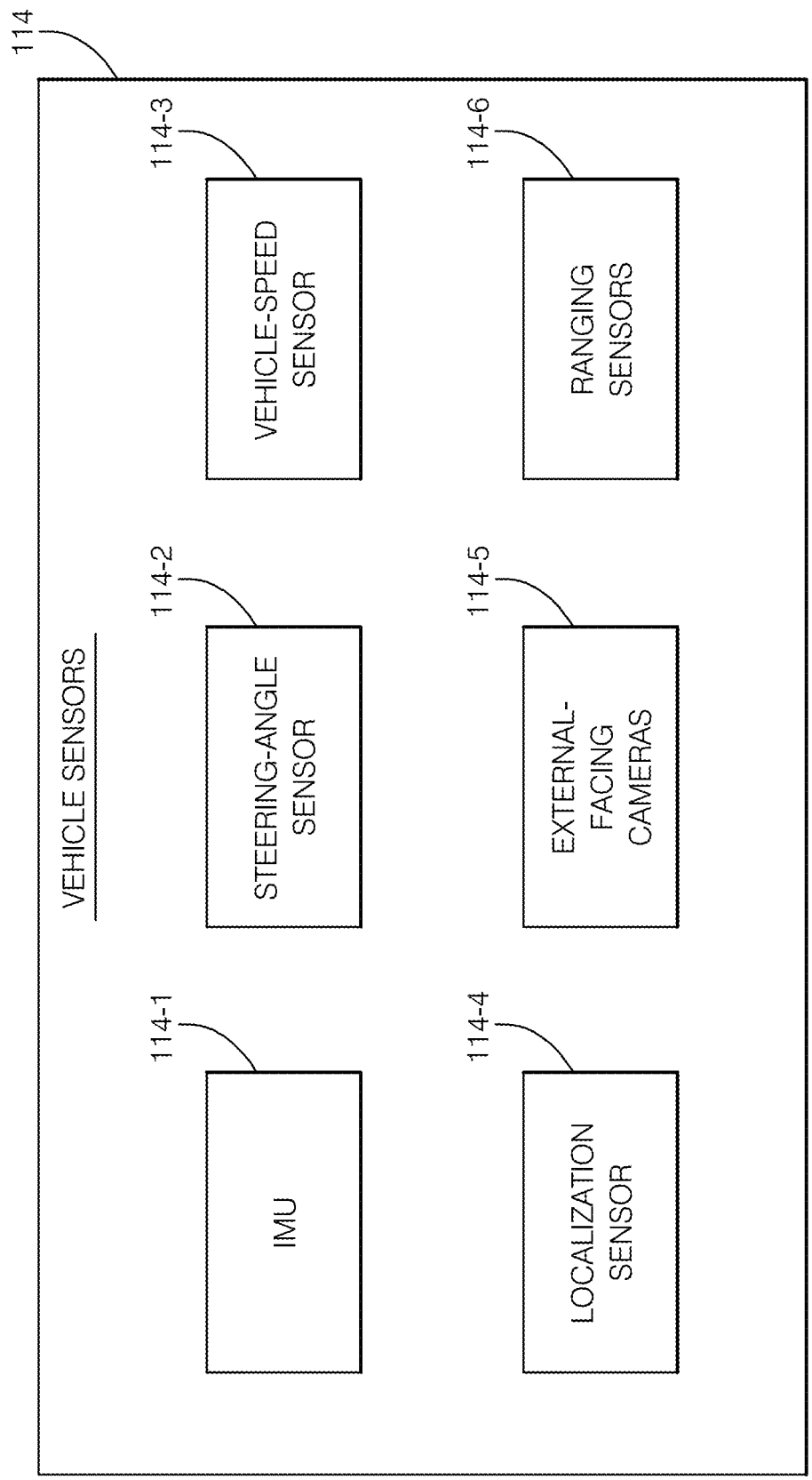
FIG. 3 illustrates an example of vehicle sensors of the vehicle lateral-control system with adjustable parameters of FIG. 1.

FIG. 3 illustrates examples of the vehicle sensors 114 that are located remotely from the system 100. The vehicle sensors 114 can include an inertial measurement unit (IMU) 114-1, a steering-angle sensor 114-2, a vehicle-speed sensor 114-3, a localization sensor 114-4, external-facing cameras 114-5, and ranging sensors 114-6.

The IMU 114-1 is an electronic device that detects a relative movement of the vehicle 108 and can include a yaw rate, a longitudinal acceleration, a lateral acceleration, a pitch rate, and a roll rate of the vehicle 108. The IMU 114-1 can use a combination of accelerometers and gyroscopes to detect the relative motion of the vehicle and can be a component of a dynamic control system installed on the vehicle 108.

The steering-angle sensor 114-2 can be a component of the steering-wheel-torque sensor 106-3 that outputs a steering angle and rate of change of the steering wheel's angular position, as described above.

The vehicle-speed sensor 114-3 can be a rotational sensor (e.g., a wheel-speed sensor) where the signal may also be used to operate a speedometer of the vehicle 108. The vehicle-speed sensor 114-3 can also use data from a global navigation satellite system (GNSS) that may be a component of the navigation system installed on the vehicle 108, for example, a global positioning system (GPS) that determines the speed based on a change in positions of the vehicle 108.

The localization sensor 114-4 can be the GNSS. GNSS refers to a constellation of satellites that transmit signals from space that provide positioning and timing data to GNSS receivers located on the vehicle 108. The receivers then use this data to determine a location of the vehicle 108. GNSS provides positioning, navigation, and timing services on a global or regional basis. GPS, BeiDou, Galileo, and GLONASS, IRNSS, and QZSS are examples of GNSS operated by the USA, the People's Republic of China, the European Union, India, and Japan, respectively.

The external-facing cameras 114-5 can be video cameras that capture images of the roadway traveled by the vehicle 108 or objects proximate to the vehicle 108. The images can include lane markings that define borders of the roadway or travel lanes and other vehicles. The controller circuit 102 can classify the objects in the images using software to identify the objects.

The ranging sensors 114-6 can be radar sensors, LiDAR sensors, or ultrasonic sensors that detect objects proximate to the vehicle 108 that may be components of an advanced driver-assistance system (ADAS) that may be installed on the vehicle 108. Radar sensors use radio frequency (RF) signals to detect objects and can determine distances based on a time to send and receive a reflected RF signal or a travel time of the RF signal. The radar sensor can also detect movement of the object based on a change in a phase of the reflected RF signal known as the Doppler effect. LiDAR sensors operate in a similar manner to radar sensors but instead use laser light pulses to detect objects and distances based on the travel time of the laser pulse and the Doppler effect. Ultrasonic sensors use the travel time of sound waves to detect objects and distances.

Image-Based Identification

Figure 4:
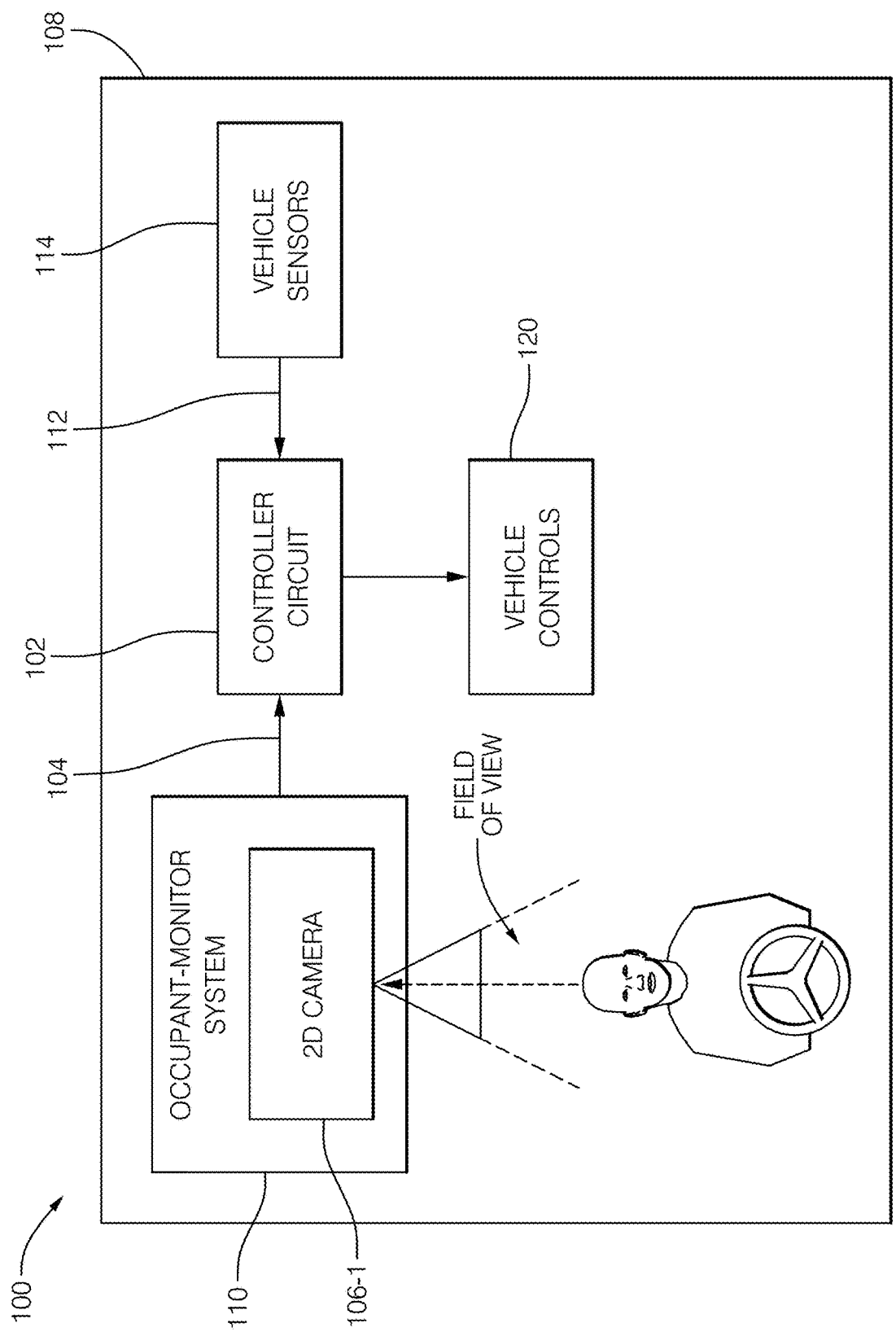
FIG. 4 illustrates an example of the vehicle lateral-control system with adjustable parameters of FIG. 1 with a driver-facing camera.

FIG. 4 illustrates an example of the system 100 with a driver-facing 2D camera 106-1 capturing images of the driver. The 2D camera 106-1 is configured to detect identifying features of a face of the driver of the vehicle 108. For example, the 2D camera 106-1 detects features unique to the driver that can be used to distinguish the driver from other passengers in the vehicle 108 or other drivers that may operate the vehicle 108.

The 2D camera 106-1 can capture an image of the face of the driver, and the OMS 110 can process the image to determine one or more facial features that are unique to the driver. The OMS 110 can use facial-recognition techniques that involve storing a digital image of the driver's face in a memory of the OMS 110. The facial-recognition techniques enable the OMS 110 to pinpoint and measure the facial features captured by the image, for example, a distance between two features (e.g., two parts of a mouth, two ears, two eyes, two pupil centers), a position of a feature (e.g., a placement of a nose relative to other facial features), or a shape of a feature (e.g., a face, a brow, a jaw-line). These measured facial features can be determined by the OMS 110 and retained the memory of the OMS 110 for later use by the system 100, as will be explained in more detail below. The OMS 110 can determine and store the identities of multiple drivers, and the identity data 104 from the OMS 110 can be periodically updated by the OMS 110 to ensure the controller circuit 102 can accurately associate the driver's identity with the adjusted lateral-control parameters 118. For example, the OMS 110 can update the identity data 104 at ten-second intervals to account for driver changes during stops.

Driver Steering Behavior Learning

Figure 5:
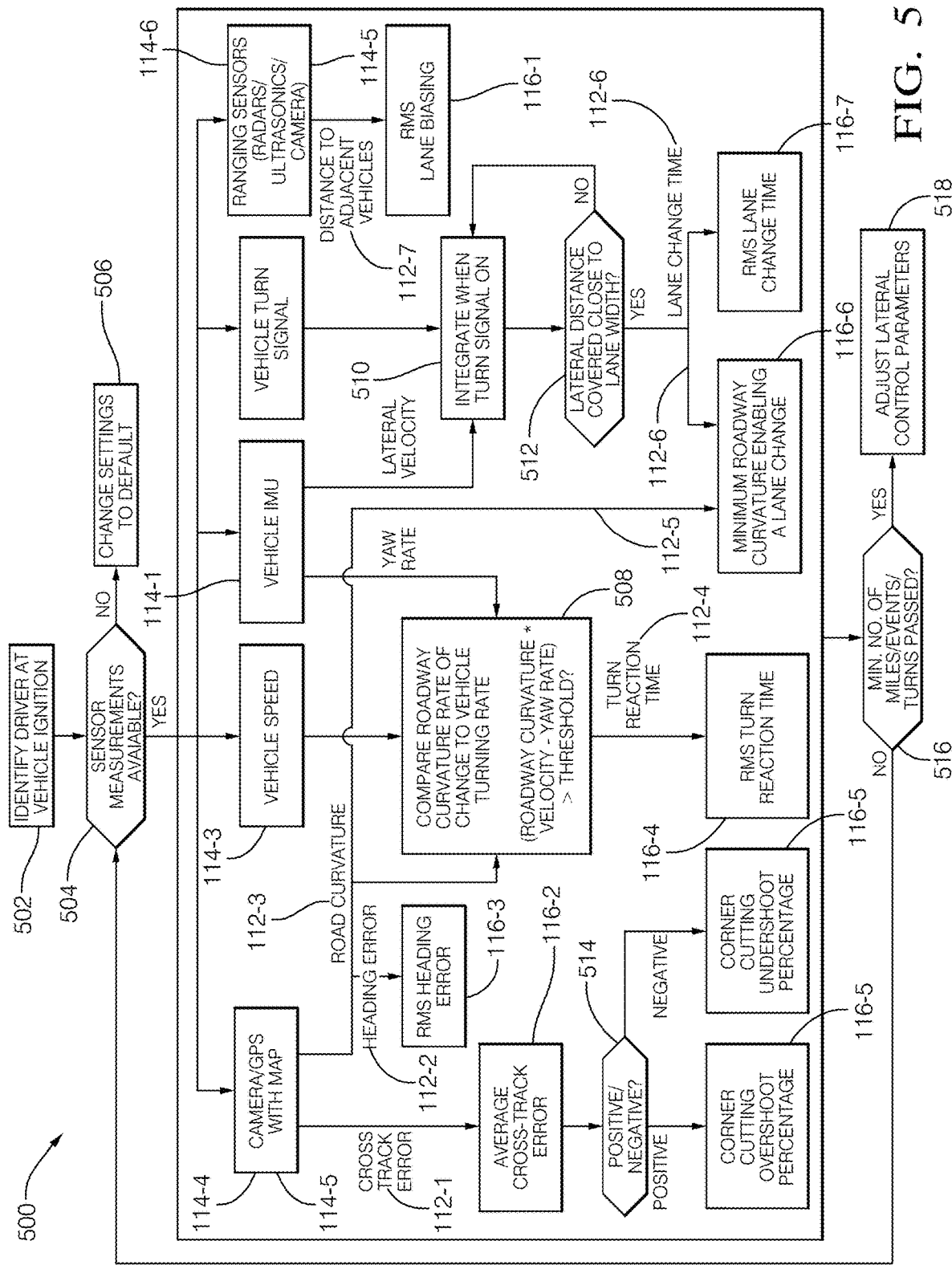
FIG. 5 illustrates an example of a data flow of the vehicle lateral-control system with adjustable parameters of FIG. 4.

FIG. 5 is a flowchart 500 illustrating an example of the types of vehicle lateral-response data 112 that can be used by the system 100 to learn the driver's steering behavior. FIG. 5 illustrates data flows from the vehicle sensors that feed the determination of the lateral-steering parameters 116.

At 502, upon vehicle ignition, the system identifies the driver using the 2D camera 106-1, as described above and illustrated in FIG. 4. At 504, the controller circuit 102 determines whether data from the vehicle sensors 114 is available. At 506, the system 100 delays the learning process and defaults to factory-installed lateral-control parameters 118 if data from the vehicle sensors 114 is not available. The factory-installed lateral-control parameters 118 are initial lateral-control parameters 118 that are not associated with a driver's identity. If data from the vehicle sensors 114 is available, the system 100 proceeds with the learning process, as will be described in more detail below.

Figure 6:
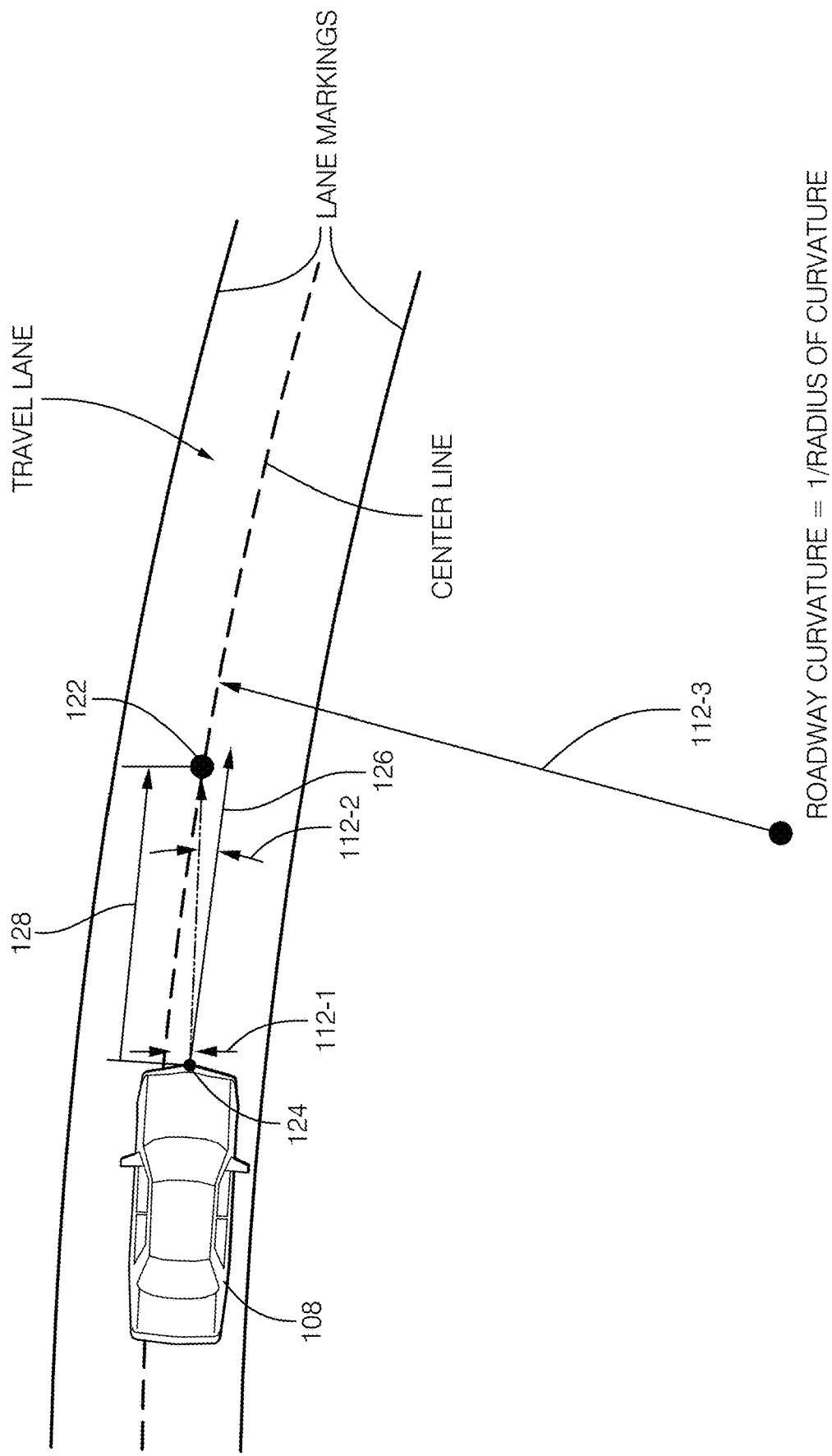
FIG. 6 illustrates an example of vehicle lateral-response data for a vehicle traveling on a roadway, in accordance with techniques of this disclosure.

FIG. 6 illustrates the vehicle 108 traveling in the travel lane indicated by lane markings on the left side and right side of the vehicle 108. In this example, the centerline of the travel lane is determined by the forward-facing camera based on the images of the lane markings. The vehicle lateral-response data 112 includes a cross-track error 112-1 relative to a lane centerline, a heading error 112-2 relative to a reference point or a look-ahead point 122, and a roadway curvature 112-3 that are detected by the external-facing camera 114-5 or the localization sensor 114-4. The cross-track error 112-1 indicates a difference between a coordinate center 124 of the vehicle 108 relative to a closest point on the centerline of the travel lane. In the example illustrated in FIG. 6, the coordinate center 124 of the vehicle 108 is a point at a center of a front bumper. In this example, a positive cross-track error 112-1 indicates the coordinate center 124 of the vehicle 108 is positioned to a right side of the centerline of the travel lane, and a negative cross-track error 112-1 indicates the coordinate center 124 is positioned to a left side of the centerline. The cross-track error 112-1 can be measured in units of distance as detected by the external-facing camera 114-5 or detected by the localization sensor 114-4. The roadway curvature 112-3 is defined as an inverse of the radius of curvature of the roadway and can be determined by the forward-facing camera or the position from the localization sensor 114-4 in relation to a digital map that includes data for the roadway curvature 112-3.

In the example illustrated in FIG. 6, the heading error 112-2 indicates the deviation in a heading 126 or pointing direction of the vehicle 108 relative to a reference point or the look-ahead point 122 on the centerline of the travel lane ahead of the vehicle 108. In some examples, the heading error 112-2 indicates the deviation between an orientation of the vehicle 108 and a tangent vector to the centerline of the travel lane. The heading error 112-2 can be measured in angular units, and a heading error 112-2 of zero degrees indicates that the driver is steering the vehicle 108 directly to the look-ahead point 122. The distance between the vehicle coordinate center 124 and the look-ahead point 122 is a look-ahead distance 128, and the controller circuit 102 can change the look-ahead distance 128 based on the roadway curvature 112-3. For example, as the roadway curvature 112-3 decreases approaching a straight road, the controller circuit 102 can increase the look-ahead distance 128 because the steering corrections needed to keep the vehicle 108 centered are smaller than for the roadway with a tighter curve or larger roadway curvature 112-3.

Referring back to FIG. 5, the vehicle lateral-response data 112 can also include a turn-reaction time 112-4 that can be determined based on the roadway curvature 112-3, the vehicle speed from the vehicle-speed sensor 114-3, and the yaw rate from the IMU 114-1. The turn-reaction time 112-4 indicates the driver's steering reaction when entering a curve from a straight section of roadway or when encountering a change in the curvature of the roadway.

At 508, the controller circuit 102 compares the roadway-curvature rate to the turning rate or yaw rate of vehicle 108 to determine the turn-reaction time 112-4. The roadway-curvature rate can be calculated by the controller circuit 102 by multiplying the roadway curvature 112-3 by the velocity of the vehicle 108. The controller circuit 102 can subtract the yaw rate from the roadway-curvature rate and compare the result to a threshold to determine whether the driver has steered the vehicle in response to the changing roadway curvature 112-3. For example, the driver steering the vehicle 108 traveling at 14 meters per second (m/s), or about 50 kilometers per hour (km/h), entering a curve having a radius of curvature of 100 meters (e.g., a roadway curvature of 0.01/m) will need to turn the vehicle 108 at a rate of about 0.14 radians/s to follow the roadway. If the yaw rate is close to zero (indicating that the driver has not turned the vehicle 108), the difference between the roadway-curvature rate and the yaw rate will be 0.14 radians/s. The controller circuit 102 can determine the turn-reaction time 112-4 by recording the time between when the vehicle 108 should turn, based on the roadway-curvature rate, and the time when the vehicle actually turns, based on the yaw rate of the vehicle 108. The controller circuit 102 can compare the turn-reaction time 112-4 to a threshold that indicates the driver has steered the vehicle 108 to follow the curve when the turn-reaction time 112-4 falls below the threshold. This threshold can be user-defined and can vary with the speed of the vehicle.

The vehicle lateral-response data 112 can also include a roadway curvature during a lane change 112-5 and a lane-change time 112-6. The roadway curvature during a lane change 112-5 can be used to determine the driver's preference for making lane change maneuvers based on the roadway curvature 112-3. For example, one driver may be comfortable changing lanes on tight curves, while another driver may not be comfortable changing lanes on any curved roads, regardless of the curvature. The lane-change time 112-6 is the time for the driver to steer the vehicle 108 from a current travel lane into an adjacent travel lane. The controller circuit 102 can use a lateral velocity derived from the lateral acceleration from the IMU 114-1 to determine the time for the driver to make the lane change and can use a vehicle turn signal as a trigger for the calculation. For example, when the driver activates the turn signal to indicate a future lane change, at 510, the controller circuit 102 can integrate or perform a summation of the lateral distance moved by the vehicle 108 based on the signals received from the IMU 114-1. At 512, the controller circuit 102 determines whether the lateral distance moved by the vehicle 108 matches the lane width. If the lateral distance moved by the vehicle 108 does not match the lane width, the controller circuit 102 continues to integrate the lateral distance until the vehicle 108 has moved the lateral distance approximating the lane width. The result of this lateral-distance integration can be used by the controller circuit 102 to determine the roadway curvature during a lane change 112-5 and the lane-change time 112-6.

The vehicle lateral-response data 112 can also include a lateral distance to adjacent vehicles 112-7. The controller circuit 102 can use data from the ranging sensors 114-6 or external-facing cameras 114-5 to determine the distance the driver places between the vehicle 108 and adjacent vehicles while traveling on the roadway. The lateral distance to adjacent vehicles 112-7 can be used by the controller circuit 102 to determine a lane-biasing parameter, as will be described below.

Lateral-Steering Parameters

Referring again to FIG. 5, the controller circuit 102 processes the raw vehicle lateral-response data 112 to determine several lateral-steering parameters 116 that include a root-mean-square (RMS) lane biasing 116-1, an average cross-track error 116-2, an RMS heading error 116-3, an RMS turn-reaction time 116-4, a corner-cutting percentage 116-5, a minimum roadway-curvature enabling a lane change 116-6, and an RMS lane-change time 116-7. In this example, the controller circuit 102 processes much of the vehicle lateral-response data 112 using the RMS technique, or the square root of the arithmetic mean of the squares of the individual data values. The processed vehicle lateral-response data 112 is used to reduce a computational load on the controller circuit 102 that can occur if only the raw vehicle lateral-response data 112 was used in place of the lateral-steering parameters 116. Other techniques of processing the raw data may be used, for example, an arithmetic mean or running average of the data points. Processing the data using the RMS is used for some parameters because the RMS provides a sense of the magnitude of the numbers in a data set without the negative values offsetting the positive values, as can occur when using the arithmetic mean. As a result, the RMS can be the same or slightly larger than the arithmetic mean.

Referring back to FIG. 5, at 514, the controller circuit 102 determines whether the average cross-track error 116-2 is a positive or negative value and further determines an overshoot or undershoot of the corner-cutting percentage 116-5, where the positive value indicates the overshoot or a steering path biased to the outside of the curves and the negative value indicates the undershoot or the steering path biased to the inside of the curves. The controller circuit 102 can determine the percentage of overshoot or undershoot based on the average cross-track error 116-2 and one half of the lane width.

At 516, the controller circuit 102 determines whether the driver has performed a sufficient number of steering maneuvers for the system 100 to learn the driver's steering behaviors, and if so, at 518, moves to adjust the settings of the lateral-control parameters 118 stored in the memory. If the driver has not performed enough steering maneuvers, the controller circuit 102 continues to collect the vehicle lateral-response data 112 from the vehicle sensors 114 until a data threshold is reached for the learning process to be completed. The data threshold can be determined through experimentation for each lateral-steering parameter 116 and may be in a range of thirty to sixty steering events.

Lateral-Control Parameters

Figure 7:
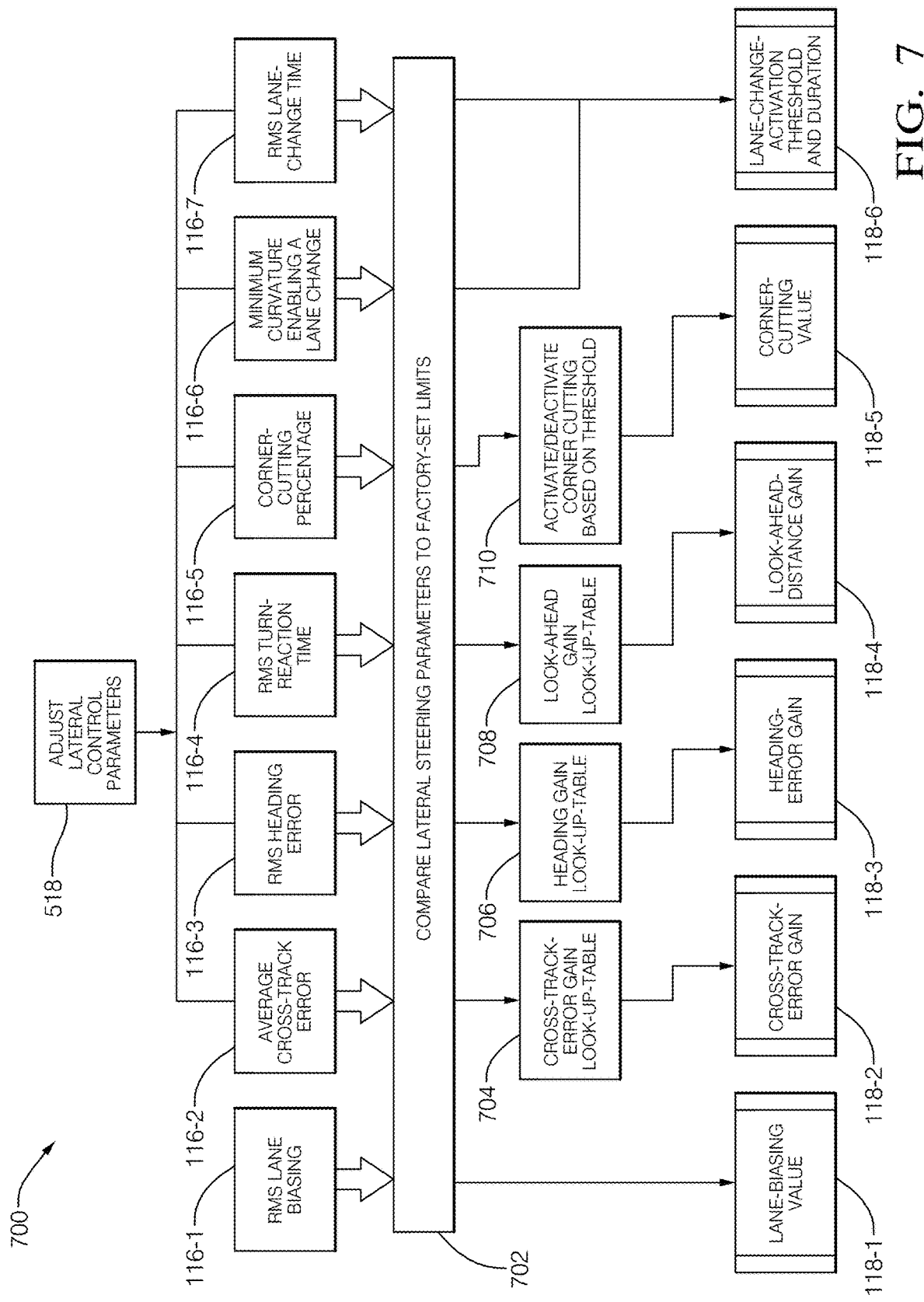
FIG. 7 illustrates examples of lateral-steering parameters and lateral-control parameters of the vehicle lateral-control system with adjustable parameters of FIG. 4.

FIG. 7 is a flow chart 700 that illustrates an example of the lateral-control parameters 118 determined by the controller circuit 102 based on the lateral-steering parameters 116. The lateral-control parameters 118 include a lane-biasing value 118-1, a cross-track-error gain 118-2, a heading-error gain 118-3, a look-ahead-distance gain 118-4, a corner-cutting value 118-5, and lane-change-activation threshold and duration 118-6.

At 702, the controller circuit 102 determines whether the lateral-steering parameters 116-1 to 116-7 are within their respective predetermined factory-set limits or ranges established by the vehicle manufacturer to ensure the system 100 does not use learned values that may create a vehicle-handling safety issue. For example, the driver that participates in vehicle racing events where the steering behavior may not be suitable for driving the vehicle 108 on the roadway in traffic. If any of the lateral-steering parameters 116-1 to 116-7 are outside of the manufacturer's predetermined limits, the controller circuit 102 defaults to the factory settings for the respective lateral-steering parameter 116. If the lateral-steering parameters 116 are within predetermined limits, the controller circuit 102 proceeds to adjust the lateral-control parameters 118, ensuring the adjusted lateral-control parameters 118 remain within the predetermined range.

The controller circuit 102 can pass through the RMS lane-biasing parameter 116-1 to become the lane-biasing value 118-1 that indicates the lateral distance the driver places between the vehicle 108 and other vehicles that are traveling in adjacent lanes.

At 704, the controller circuit 102 compares the average cross-track error 116-2 to a look-up table stored in the memory. In the example illustrated in FIG. 7, the look-up table is used to reduce computational loads on the controller circuit 102. In other examples, the controller circuit 102 can compute the gain without the look-up table or access the gain from a cloud storage facility that may be accessed by the controller circuit 102 via the infotainment system of the vehicle 108. The controller circuit 102 can interpolate the cross-track-error gain 118-2 based on the values in the look-up table and store the adjusted gain in the memory.

At 706, the controller circuit 102 compares the RMS heading error 116-3 to a heading gain look-up table, interpolates the heading-error gain 118-3, and stores the updated gain in the memory.

At 708, the controller circuit 102 compares the RMS turn-reaction time 116-4 to a look-ahead gain look-up table, interpolates the look-ahead-distance gain 118-4, and stores the updated gain in the memory.

At 710, the controller circuit 102 converts the corner-cutting percentage 116-5 to a distance based on the current lane width and compares this distance to a threshold. The controller circuit 102 activates the corner-cutting when the corner-cutting distance is above the threshold. The threshold can be user-defined and can be based on the vehicle speed. For example, a threshold of 0.02 meters would allow the activation of corner-cutting when the corner-cutting distance exceeds 0.02 meters. The controller circuit 102 then stores the updated corner-cutting value 118-5 in the memory.

The controller circuit 102 can pass through the minimum roadway curvature, enabling a lane change 116-6 and the RMS lane-change time 116-7 to generate the lane-change-activation threshold and duration 118-6. The controller circuit can set the curvature threshold to the minimum curvature value based on the minimum roadway curvature enabling a lane change 116-6 and can set the lane-change duration based on the RMS lane-change time 116-7.

The controller circuit 102 can store the adjusted lateral-control parameters 118 in the memory and associate the adjusted values with the identity of the driver that is also stored in the memory. When the vehicle 108 is being operated in the autonomous-driving mode, the controller circuit 102 can recognize the driver in the driver's seat and recall the adjusted lateral-control parameters 118 from the memory for the recognized driver. The controller circuit 102 can then operate the vehicle 108 in the autonomous-driving mode using these recalled values to reproduce the driver's steering habits.

Human Machine Interface (HMI)

Figure 8:
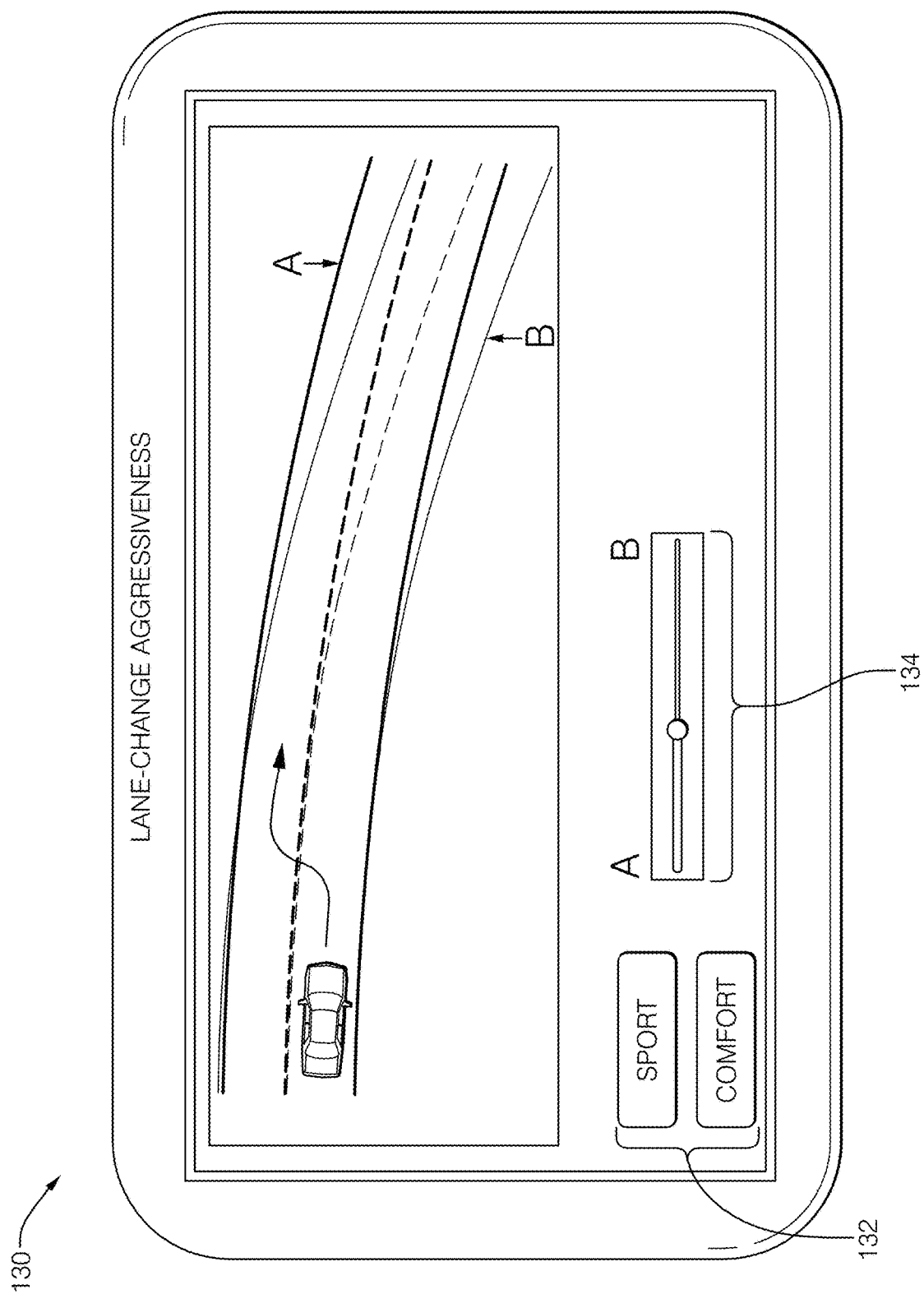
FIG. 8 illustrates an example of a human machine interface (HMI) of the vehicle lateral-control system with adjustable parameters of FIG. 4.
Figure 9:
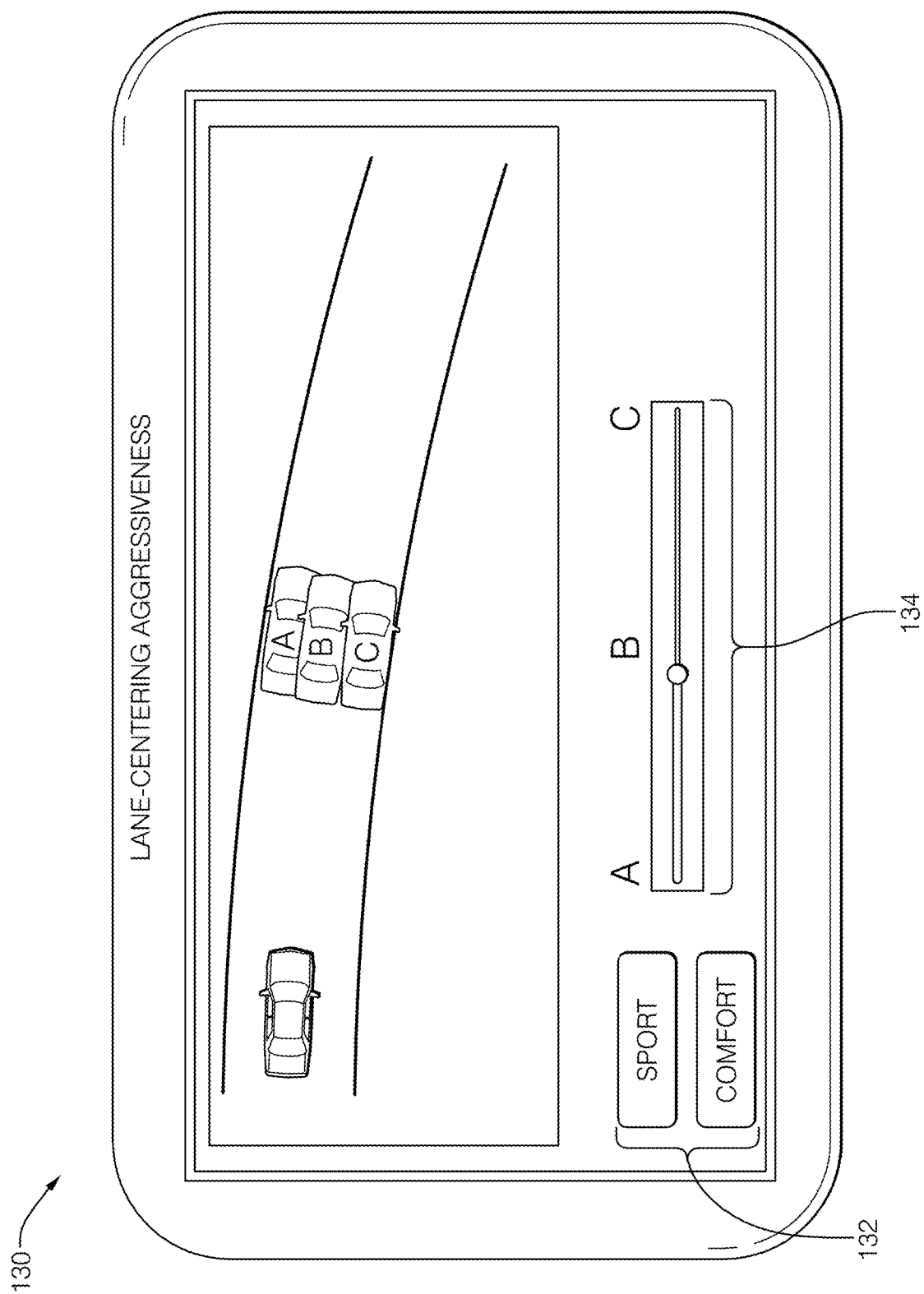
FIG. 9 illustrates another example of a human machine interface (HMI) of the vehicle lateral-control system with adjustable parameters of FIG. 4.
Figure 10:
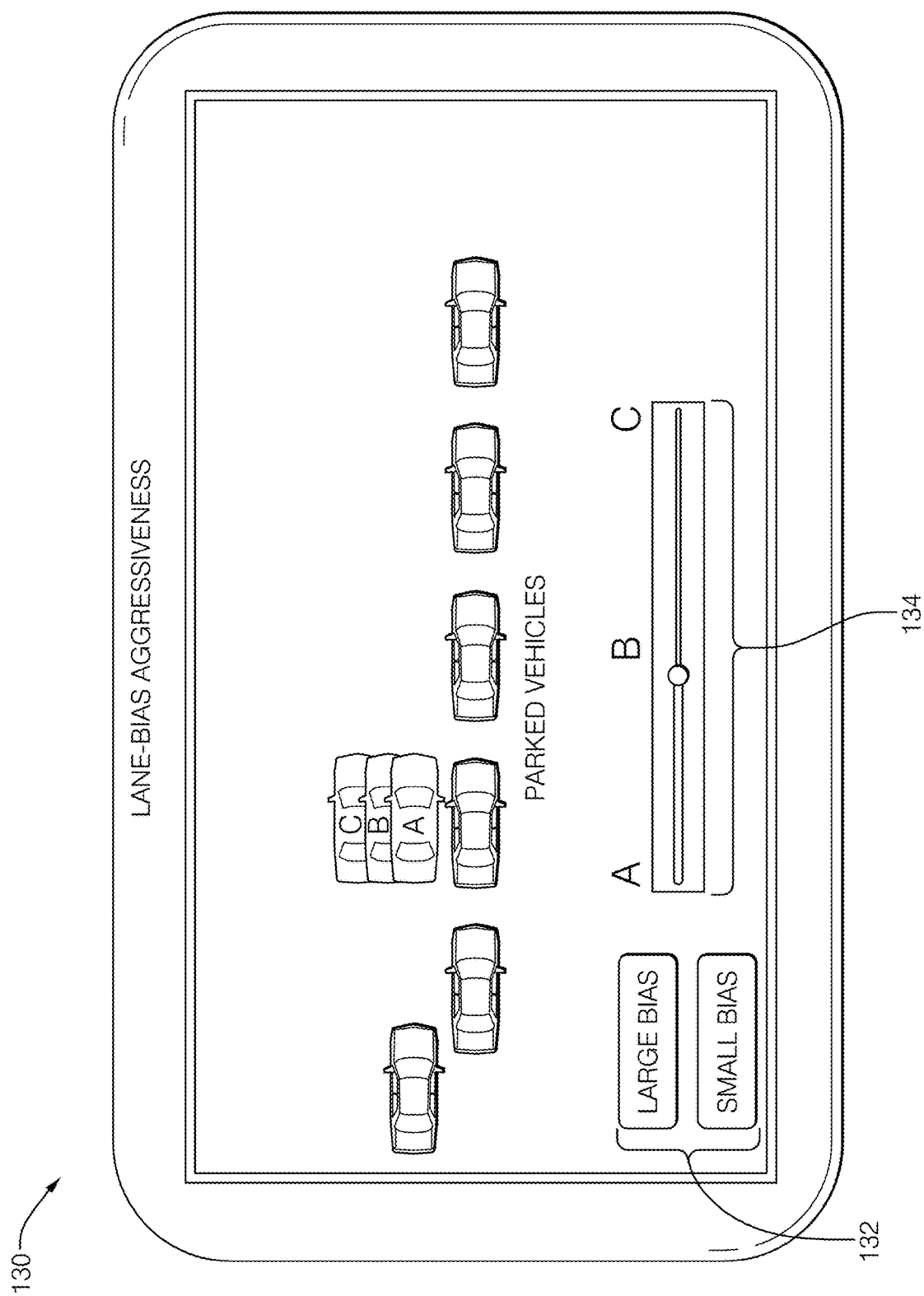
FIG. 10 illustrates yet another example of a human machine interface (HMI) of the vehicle lateral-control system with adjustable parameters of FIG. 4.

FIGS. 8-10 illustrate examples of a human machine interface 130 (HMI 130) that can receive input from the driver indicating the driver's preference for a lateral-control aggressiveness while the vehicle 108 is operated in the autonomous-driving mode. The examples shown in FIGS. 8-10 are not intended to encompass all the possible lateral-control input scenarios and are shown to illustrate the concept for receiving input from the driver. The HMI 130 can be presented to the driver on a console display of the vehicle 108 or as an application on a mobile device, for example, a mobile phone or tablet that is synchronized with the vehicle 108. The HMI 130 can include inputs for preset selections 132 and adjustable selections 134 that provide the driver with the opportunity to further customize their riding experience when the vehicle 108 is operated in the autonomous-driving mode.

In the example illustrated in FIG. 8, the HMI 130 presents selections for a lane-change aggressiveness that indicates the driver's preference for a minimum road-curvature to enable a lane change 116-6. The controller circuit 102 can further adjust the lateral-control parameters 118 associated with the identity of the driver that are stored in the memory and used to operate the vehicle 108 in the autonomous-driving mode. In this example, the driver can select from the two preset selections 132 (e.g., sport or comfort) or can select from the adjustable selections 134 by moving a slider bar between positions A and B. In this example, the sporty selection can indicate the driver prefers lane changes on roadways with more curvature compared to the comfort selection where the driver prefers lane changes on roadways with less curvature. The selections of either A or B on the slider bar provide the driver with a visual concept for the curvature of the roadway, with selection A being less aggressive than selection B. The controller circuit 102 can adjust the lateral-control parameters 118 that relate to the driver's input, for example, adjusting the previously stored lane-change activation threshold and duration 118-6 that was determined via the driver learning process.

FIG. 9 illustrates an example where the HMI 130 presents selections for a lane-centering aggressiveness that indicates the driver's preference for lane centering on curves. In this example, the sporty selection can indicate the driver's preference for steering closer to the inside of curves, while the comfort selection can indicate the driver's preference for steering closer to the outside of curves where the centrifugal forces perceived by the driver may be reduced. The slider bar offers the driver additional customization options for the lane-centering aggressiveness, as illustrated by positions A, B, and C. The controller circuit 102 can adjust the lateral-control parameters 118 that relate to the driver's selection, for example, adjusting the lane-biasing value 118-1 or the cross-track-error gain 118-2.

FIG. 10 illustrates an example where the HMI 130 presents selections for a lane-bias aggressiveness that indicates the driver's preference for positioning the vehicle 108 in the lane adjacent to parked cars. In this example, the small bias selection can indicate the driver's preference for driving closer to the line of parked cars, while the large bias selection can indicate the driver's preference for keeping farther away from the parked cars. The slider bar offers the driver additional customization options for the lane-bias aggressiveness, as illustrated by positions A, B, and C. The controller circuit 102 can adjust the lateral-control parameters 118 that relate to the driver's selection, for example, adjusting the lane-biasing value 118-1.

Figure 11:
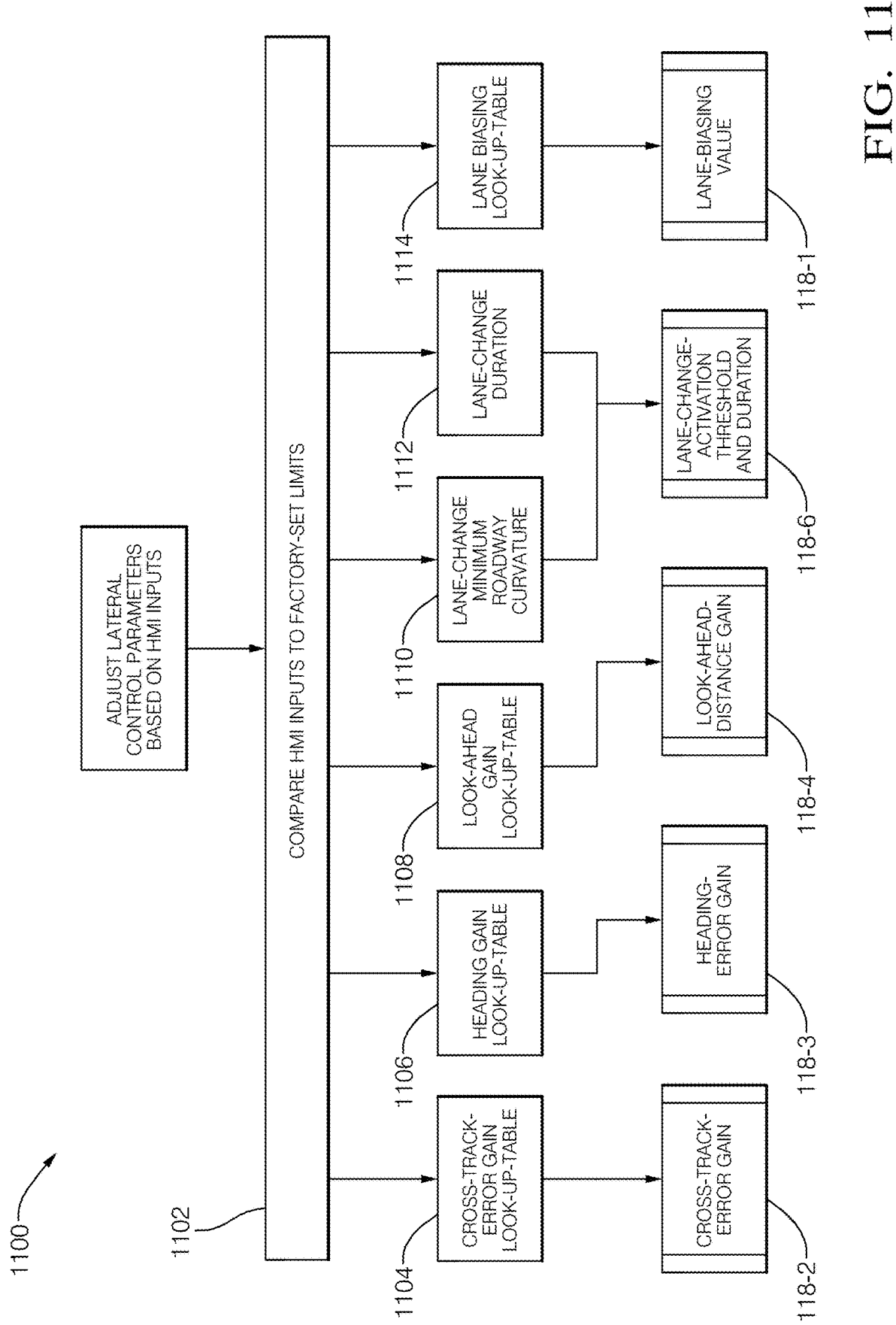
FIG. 11 is a flow chart illustrating an example lateral-control parameters that are adjusted based on the HMI inputs, in accordance with techniques of this disclosure.

The controller circuit 102 can adjust the stored lateral-control parameters 118 based on values from look-up tables associated with the selections of lateral-control aggressiveness, as illustrated in the flow chart 1100 in FIG. 11. The process for adjusting the lateral-control parameters 118 based on the look-up tables is the same as described above and illustrated in FIG. 7. At 1102, the controller circuit compares the HMI inputs to the factory-set limits to ensure the system 100 does not use learned values that may create a vehicle handling safety issue. At 1104 to 1114, the controller circuit compares the HMI inputs to look-up tables or predetermined thresholds to further adjust the lateral-control parameters 118-1 to 118-4, and 118-6.

Figure 12:
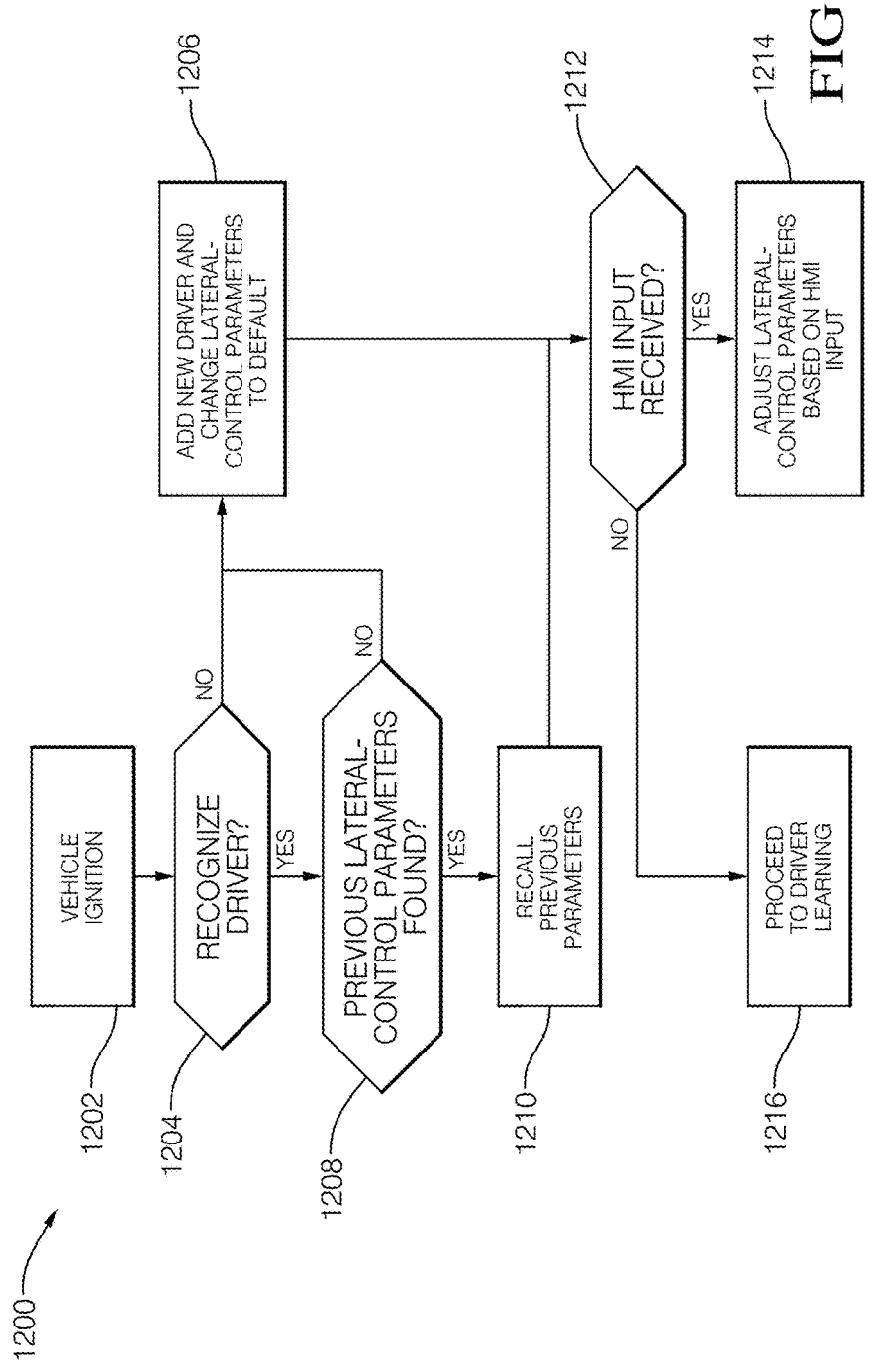
FIG. 12 is an example logic flow of the vehicle lateral-control system with adjustable parameters of FIG. 1.

FIG. 12 is a flow diagram illustrating an example logic flow 1200 performed by the controller circuit 102. The logic flow starts at 1202 with vehicle ignition and ends at 1216 with driver learning. In this example, at 1202, upon the driver actuating a vehicle ignition switch inside the vehicle 108, the controller circuit 102 receives the identity data 104 from the OMS 110, as described above. At 1204, the controller circuit 102 determines whether the driver is recognized. If the controller circuit 102 does not recognize the driver, at 1206, the controller circuit 102 adds the new driver based on the identity data 104 and changes the lateral-control parameters 118 to the default factory settings that are not associated with a driver's identity.

If the controller circuit 102 recognizes the driver, at 1208, the controller circuit 102 determines whether previous lateral-control parameters 118 are stored in the memory. If no lateral-control parameters 118 are stored in the memory, at 1206, the controller circuit 102 adds the new driver based on the identity data 104 and changes the lateral-control parameters 118 to the default factory settings. If lateral-control parameters 118 are stored in the memory, at 1210, the controller circuit 102 recalls the previous lateral-control parameters 118 from the memory that are associated with the recognized driver.

At 1212, the controller circuit 102 determines whether input via the HMI 130 has been received. If input via the HMI 130 has been received, at 1214, the controller circuit 102 adjusts the lateral-control parameters 118 based on the HMI input. If input via the HMI 130 has not been received, at 1216, the controller circuit 102 proceeds with the driver learning process as illustrated in FIGS. 5 and 7 and adjusts the lateral-control parameters 118 as described above.

Other Example Identification Techniques

The examples described above are related to cameras detecting an image of the face of the driver. In other examples, the system 100 can be configured with other inputs that detect other identifying features that can be used to determine the driver's identity. The examples below describe other sensors that can detect other identifying features of the driver. The system architecture and logic flows are similar to the examples illustrated in FIG. 4, except for the different sensors and corresponding control circuitry to operate the different sensors.

Voice-Based Identification

In this example, microphones installed on the vehicle 108 detect the voice of the driver. The OMS 110 can use voice-recognition software to process voice recordings to determine the identifying features that are unique to the detected voices and generate feature vectors based on these identifying features. In some examples, the voice-recognition software uses a text-dependent approach where a passphrase spoken by the driver is compared to a recording of the passphrase stored in the memory of the OMS 110. In other examples, the voice-recognition software uses a text-independent approach where the driver can speak freely to the system 100, and the software learns the driver's speech utterances over time. The identifying features of the feature vector can include various components extracted from an acoustic wave speech signal, for example, amplitudes and frequencies from particular bandwidths, formant frequencies or resonances in the frequency spectrum, pitch contours or variations in a fundamental frequency, and coarticulation in which the speech organs prepare to produce the next sound while transitioning from a previous sound.

Fingerprint-Based Identification

In this example, capacitive fingerprint sensors installed on the vehicle 108 (e.g., on the steering wheel or ignition switch) can detect the fingerprint of the driver. The OMS 110 can use fingerprint-recognition software to process the fingerprints to determine the identifying features that are unique to the detected fingerprints and generate feature vectors based on these identifying features. The identifying features of the feature vector can include various components extracted from the fingerprint, for example, ridge endings and ridge bifurcations.

Eye-Based Identification

In this example, the cameras are infrared cameras (IR cameras), and the eyes are illuminated with light in the near-IR spectrum by IR illuminators located in the vehicle cabin. In some examples, the OMS 110 can use iris-recognition software that processes images of the iris of one or both eyes. In other examples, the OMS 110 can use retinal recognition software that processes images of the retina of one or both eyes. The identifying features of the feature vector can include various components extracted from the patterns of the iris or retina using known methods of feature extraction, for example, Gabor filters to extract frequency content, discrete wavelet transform (DWT), discrete cosine transform (DCT), or Harr wavelet transform (HWT).

Example Method

Figure 13:
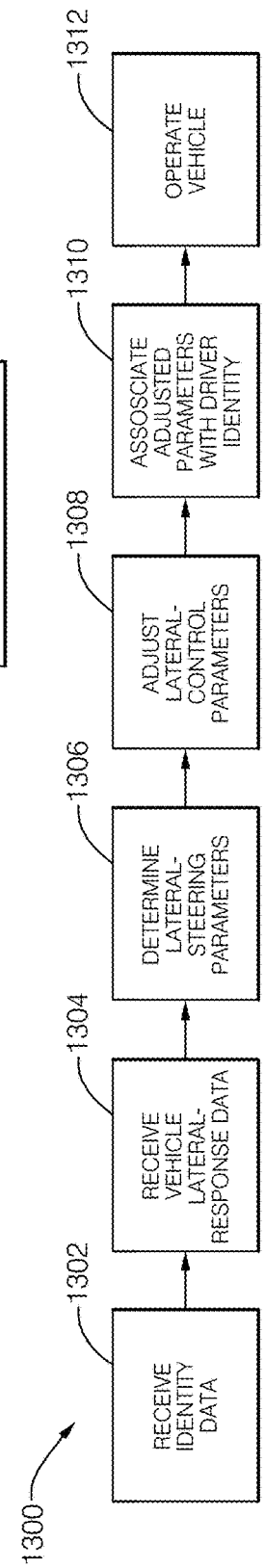
FIG. 13 is an example method of operating the example of the vehicle lateral-control system with adjustable parameters of FIG. 1.

FIG. 13 illustrates example methods 1300 performed by the system 100. For example, the controller circuit 102 configures the system 100 to perform operations 1302 through 1312 by executing instructions associated with the controller circuit 102. The operations (or steps) 1302 through 1312 are performed but not necessarily limited to the order or combinations in which the operations are shown herein. Further, any of one or more of the operations may be repeated, combined, or reorganized to provide other operations.

Step 1302 includes RECEIVE IDENTITY DATA. This can include the controller circuit 102 receiving identity data 104 from the driver-monitor sensor 106, indicating the identity of the driver of the vehicle 108. The driver-monitor sensor 106 may be a component of the OMS 110, as described above. The identity data 104 can be image-based, voice-based, fingerprint-based, or eye-based data, and the identity data 104 can be stored in the memory of the controller circuit 102 for multiple drivers.

Step 1304 includes RECEIVE VEHICLE LATERAL-RESPONSE DATA. This can include the controller circuit 102 receiving vehicle lateral-response data 112 from vehicle sensors 114 based on steering maneuvers performed as the vehicle 108 operates under control of the driver, as described above. The vehicle sensors 114 can directly or indirectly detect lateral movement of the vehicle 108. The vehicle lateral-response data 112 can be used by the system 100 to learn the driver's steering behavior and can include the cross-track error 112-1 relative to a lane centerline, the heading error 112-2 relative to the look-ahead point 122, the roadway curvature 112-3, the turn-reaction time 112-4, the roadway curvature during a lane change 112-5, the lane-change time 112-6, and the lateral distance to adjacent vehicles 112-7, as described above.

Step 1306 includes DETERMINE LATERAL-STEERING PARAMETERS. This can include the controller circuit 102 determining the lateral-steering parameters 116 based on the vehicle lateral-response data 112, as described above. The controller circuit 102 processes the raw vehicle lateral-response data 112 to determine the lateral-steering parameters 116. The lateral-steering parameters 116 include the RMS lane biasing 116-1, the average cross-track error 116-2, the RMS heading error 116-3, the RMS turn-reaction time 116-4, the corner-cutting percentage 116-5, the minimum roadway-curvature enabling a lane change 116-6, and the RMS lane-change time 116-7, as described above.

Step 1308 includes ADJUST LATERAL-CONTROL PARAMETERS. This can include the controller circuit 102 adjusting the lateral-control parameters 118 that are stored in the memory based on the lateral-steering parameters 116 of the identified driver. The lateral-control parameters 118 are used to control the vehicle 108 when the vehicle 108 is operating in the autonomous-driving mode and can reproduce the driver's steering behavior. The lateral-control parameters 118 include the lane-biasing value 118-1, the cross-track-error gain 118-2, the heading-error gain 118-3, the look-ahead-distance gain 118-4, the corner-cutting value 118-5, and the lane-change-activation threshold and duration 118-6, as described above. The controller circuit 102 adjusts the lateral-control parameters 118 within a predetermined range established by the vehicle manufacturer to ensure safe vehicle handling. The controller circuit 102 stores the adjusted lateral-control parameters 118 in the memory for later recall, as described above.

The controller circuit 102 can further adjust the lateral-control parameters 118 that are stored in the memory via inputs from the HMI 130, as described above. The HMI 130 can include preset selections 132 and adjustable selections 134 that further enable the driver to customize their experience when operating the vehicle 108 in the autonomous-driving mode.

Step 1310 includes ASSOCIATE ADJUSTED PARAMETERS WITH DRIVER IDENTITY. This can include the controller circuit 102 associating or matching the adjusted lateral-control parameters 118 stored in the memory with the identity of the driver that is also stored in the memory, as described above. The controller circuit 102 can associate several driver's identities with their respective adjusted lateral-control parameters 118 in the memory of the controller circuit 102 and recall the adjusted lateral-control parameters 118 upon recognizing the driver of the vehicle 108.

Step 1312 includes OPERATE VEHICLE. This can include the controller circuit 102 operating the vehicle 108 in the autonomous-driving mode using the lateral-control parameters 118 stored in the memory that are associated with the driver's identity to reproduce the driver's steering habits, as described above.

EXAMPLES

In the following section, examples are provided.

Example 1. A system comprising a controller circuit configured to: receive, from a driver-monitoring sensor, identity data indicating an identity of a driver of a vehicle; receive, from one or more vehicle sensors, vehicle lateral-response data based on steering maneuvers performed as the vehicle operates under control of the driver; determine, based on the vehicle lateral-response data, a plurality of lateral-steering parameters of the vehicle; adjust, based the plurality of lateral-steering parameters, lateral-control parameters of the vehicle; associate the adjusted lateral-control parameters of the vehicle with the identity of the driver; and operate the vehicle according to the lateral-control parameters associated with the identity of the driver.

Example 2. The system of the previous example, wherein the controller circuit is further configured to: refrain from operating the vehicle according to initial lateral-control parameters associated with the vehicle in response to operating the vehicle according to the lateral-control parameters associated with the identity of the driver of the vehicle, the initial lateral-control parameters being different than the lateral-control parameters associated with the identity of the driver.

Example 3. The system of any of the previous examples, wherein the controller circuit is further configured to store a plurality of adjusted vehicle lateral-control parameters associated with a plurality of driver identities in a memory of the controller circuit, the plurality of driver identities including the identity of the driver.

Example 4. The system of any of the previous examples, wherein the system further includes a human machine interface (HMI) configured to receive input from the driver indicating a lateral-control aggressiveness, and wherein the controller circuit is further configured to adjust, based on the driver input, the vehicle lateral-control parameters associated with the identity of the driver.

Example 5. The system of any of the previous examples, wherein the HMI includes inputs of one or more of preset selections and adjustable selections.

Example 6. The system of any of the previous examples, wherein the preset and adjustable selections include one or more of a lane bias relative to stationary vehicles on a roadway, a lane centering on curves, and a minimum road-curvature to enable a lane change.

Example 7. The system of any of the previous examples, wherein the controller circuit is further configured to adjust the stored vehicle lateral-control parameters based on values from look-up tables associated with the selections of lateral-control aggressiveness.

Example 8. The system of any of the previous examples, wherein the lateral-response data includes one or more of a cross-track error relative to a lane center, a heading error relative to a reference point, a turn-reaction time, a roadway curvature during a lane change, a lane-change time, and a lateral distance to adjacent vehicles.

Example 9. The system of any of the previous examples, wherein the lateral-steering parameters include one or more of a root mean square (RMS) lane biasing, an average cross-track error, an RMS heading error, an RMS turn-reaction time, a corner-cutting percentage, a minimum roadway curvature enabling a lane change, and an RMS lane-change time.

Example 10. The system of any of the previous examples, wherein the lateral-control parameters include one or more of a lane-biasing value, a cross-track-error gain, a heading-error gain, a look-ahead distance gain, a corner-cutting value, and lane change activation threshold and duration.

Example 11. The system of any of the previous examples, wherein the controller circuit is further configured to adjust the lateral-control parameters within a predetermined range.

Example 12. The system of any of the previous examples, wherein the one or more sensors include an inertial measurement unit (IMU), a steering angle sensor, a vehicle speed sensor, a localization sensor, a camera, and a ranging sensor.

Example 13. A method, comprising: receiving from a driver-monitoring sensor, with a controller circuit, identity data indicating an identity of a driver of a vehicle; receiving from one or more vehicle sensors, with the controller circuit, vehicle lateral-response data based on steering maneuvers performed as the vehicle operates under control of the driver; determining based on the vehicle lateral-response data, with the controller circuit, a plurality of lateral-steering parameters of the vehicle; adjusting based on the plurality of lateral-steering parameters, with the controller circuit, lateral-control parameters of the vehicle; associating the adjusted lateral-control parameters of the vehicle with the identity of the driver; and operating the vehicle, with the controller circuit, according to the lateral-control parameters associated with the identity of the driver.

Example 14. The method of the previous example, further comprising refraining from operating the vehicle according to initial lateral-control parameters associated with the vehicle in response to operating the vehicle according to the lateral-control parameters associated with the identity of the driver of the vehicle, the initial lateral-control parameters being different than the lateral-control parameters associated with the identity of the driver.

Example 15. The method of any of the previous examples, further comprising storing, with the controller circuit, a plurality of adjusted vehicle lateral-control parameters associated with a plurality of driver identities in a memory of the controller circuit.

Example 16. The method of any of the previous examples, further comprising: receiving, via a human machine interface (HMI), input from the driver indicating a lateral-control aggressiveness; and adjusting, with the controller circuit, the stored vehicle lateral-control parameters based on the driver input.

Example 17. The method of any of the previous examples, wherein the HMI includes inputs of one or more of preset selections and adjustable selections.

Example 18. The method of any of the previous examples, wherein the preset and adjustable selections include one or more of a lane bias relative to stationary vehicles on the roadway, a lane centering on curves, and a minimum road-curvature to enable a lane change.

Example 19. The method of any of the previous examples, further comprising adjusting the stored vehicle lateral-control parameters based on values from look-up tables associated with the selections of lateral-control aggressiveness.

Example 20. The method of any of the previous examples, wherein receiving the lateral-response data includes receiving one or more of a cross-track error relative to a lane center, a heading error relative to a reference point, a turn-reaction time, a roadway curvature during a lane change, a lane-change time, and a lateral distance to adjacent vehicles.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method, comprising:
receiving, via a human machine interface (HMI), an input from a driver of a vehicle indicating a lateral-control aggressiveness, the input comprising a preset or adjustable selection of a minimum road-curvature to enable a lane change;
receiving from a driver-monitoring sensor, with a controller circuit, identity data indicating an identity of the driver;
receiving from one or more vehicle sensors separate from the HMI, with the controller circuit, vehicle lateral-response data based on steering maneuvers performed as the vehicle operates one or more lane changes under control of the driver, the vehicle lateral-response data comprising information about lateral movements or lateral accelerations of the vehicle as it operates the lane changes;
determining, based on the vehicle lateral-response data, with the controller circuit, a plurality of lateral-steering parameters of the vehicle, the vehicle lateral-response data indicative of the lateral movements or lateral accelerations of the vehicle;
adjusting based on the plurality of lateral-steering parameters and the input from the driver to the HMI, with the controller circuit, lateral-control parameters of the vehicle, the lateral-control parameters usable to adjust positioning of the vehicle within a travel lane;
associating the adjusted lateral-control parameters of the vehicle with the identity of the driver; and
operating the vehicle during a lane change, with the controller circuit, according to the lateral-control parameters associated with the identity of the driver.

2. The method of claim 1, further comprising refraining from operating the vehicle during the lane change according to initial lateral-control parameters associated with the vehicle in response to operating the vehicle during the lane change according to the lateral-control parameters associated with the identity of the driver of the vehicle, the initial lateral-control parameters being different than the lateral-control parameters associated with the identity of the driver.

3. The method of claim 1, further comprising storing, with the controller circuit, a plurality of adjusted vehicle lateral-control parameters associated with a plurality of driver identities in a memory of the controller circuit.

4. The method of claim 1, further comprising adjusting the stored vehicle lateral-control parameters based on values from look-up tables associated with the selections of lateral-control aggressiveness.

5. The method of claim 1, wherein receiving the lateral-response data includes receiving one or more of a roadway curvature during a lane change and a lane-change time.

6. The method of claim 1, wherein adjusting the lateral-control parameters of the vehicle comprises:
generating a first set of lateral-control parameters based on the lateral-steering parameters; and
adjusting the first set of lateral-control parameters based on the input from the driver to the HMI to create a second set of lateral-control parameters.

7. A system comprising:
a human machine interface (HMI) configured to receive an input from a driver of a vehicle indicating a minimum road curvature for lane changes; and a controller circuit configured to:
- receive an indication of the minimum road curvature for lane changes from the HMI;
- associate the minimum road curvature for lane changes with the driver;
- determine that an active driver of the vehicle is the driver;
- receive an indication to perform a lane change;
- determine, based on information from one or more vehicle sensors of the vehicle, that a current road curvature is above the minimum road curvature associated with the driver; and
- cause, based on the indication to perform the lane change and the determination that the current road curvature is above the minimum road curvature associated with the driver, the vehicle to perform the lane change.

8. The system of claim 7, wherein:
- the HMI is further configured to receive another input from another driver of the vehicle indicating another minimum road curvature for lane changes; and
- the controller circuit is further configured to associate the other minimum road curvature for lane changes with the other driver.

9. The system of claim 8, wherein the controller circuit is further configured to, at a later time:
- determine that the active driver of the vehicle is the other driver;
- receive another indication to perform another lane change;
- determine, based on information from the vehicle sensors, that a current road curvature is above the other minimum road curvature associated with the other driver; and
- cause the vehicle to perform the other lane change.

10. The system of claim 7, wherein the minimum road curvature is based on a look-up table.

11. A method comprising:
- determining a minimum road curvature for lane changes of a vehicle;
- associating the minimum road curvature for lane changes with a driver of the vehicle;
- determining that an active driver of the vehicle is the driver;
- receiving an indication to perform a lane change;
- determining, based on information from one or more vehicle sensors of the vehicle, that a current road curvature is above the minimum road curvature associated with the driver; and
- causing, based on the indication to perform the lane change and the determination that the current road curvature is above the minimum road curvature associated with the driver, the vehicle to perform a lane change.

12. The method of claim 11, wherein the determining the minimum road curvature for lane changes comprises receiving an input to a human machine interface (HMI).

13. The method of claim 12, wherein the receiving the input comprises receiving an input to a preset selection or an adjustable input field.

14. The method of claim 11, wherein the determining the minimum road curvature for lane changes comprises determining a minimum of respective road curvatures determined for one or more lane changes while the vehicle is operated under control of the driver.

15. The method of claim 14, wherein the road curvatures are determined based on camera data.

16. The method of claim 14, wherein the road curvatures are determined based on vehicle lateral-response data and vehicle speeds during the lane changes.

17. The method of claim 16, wherein the vehicle lateral-response data comprises lateral accelerations.

18. The method of claim 11, wherein:
- the determining the minimum road curvature for lane changes comprises:
  - determining a first minimum road curvature for lane changes based on a minimum of respective road curvatures determined for one or more lane changes while the vehicle is operated under control of the driver; and
  - determining a second minimum road curvature for lane changes based on information from an human machine interface (HMI); and
- the minimum road curvature for lane changes is based on the first minimum road curvature for lane changes and the second minimum road curvature for lane changes.

19. The method of claim 18, wherein the second minimum road curvature is used to adjust the first minimum road curvature to arrive at the minimum road curvature.

20. The method of claim 11, wherein the method is performed by a controller circuit of the vehicle.

* * * * *